United States Patent [19]
Iida et al.

[11] 4,035,817
[45] July 12, 1977

[54] REMOTE CONTROLLED CAMERA

[75] Inventors: Yozo Iida, Komae; Shigeo Akasaka, Kodaira; Yasuhito Kawahara, Tokyo, all of Japan

[73] Assignee: Nippon Kogaku K.K., Tokyo, Japan

[21] Appl. No.: 654,767

[22] Filed: Feb. 3, 1976

[30] Foreign Application Priority Data

Feb. 12, 1975  Japan ................. 50-18567[U]

[51] Int. Cl.² ............................. G03B 13/02
[52] U.S. Cl. .................. 354/219; 352/179; 352/141; 354/76; 354/295
[58] Field of Search ......... 354/219, 76, 53, 154, 354/152, 295, 75, 266, 67; 352/131, 141, 179; 343/225; 340/221

[56] References Cited
U.S. PATENT DOCUMENTS

| 3,686,672 | 8/1972 | Ishizuka | 354/76 X |
| 3,821,768 | 6/1974 | Urano et al. | 354/219 |

*Primary Examiner*—John Gonzales
*Attorney, Agent, or Firm*—Fitzpatrick, Cella, Harper & Scinto

[57] ABSTRACT

A remote controlled camera having a fitting member for mounting a signal receiving device to receive a remote control signal on the body of the camera, and a light intercepting device incorporated in the camera body to intersect a light path of an incident light beam through an eye-piece and to be actuated in conjunction with mounting operation of a reote control signal receiver on the camera body.

3 Claims, 6 Drawing Figures

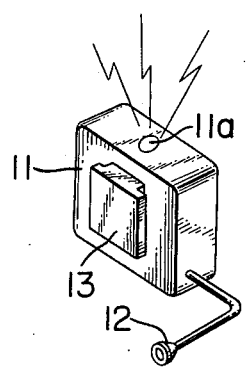
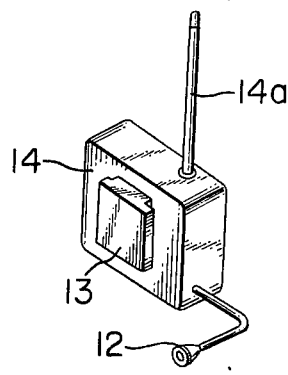
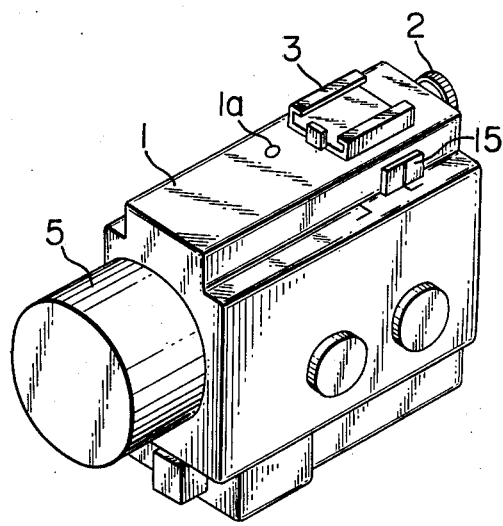
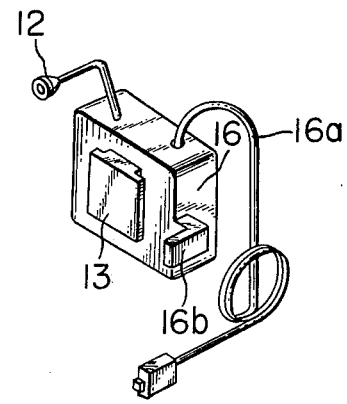

4,035,817

REMOTE CONTROLLED CAMERA

BACKGROUND OF THE INVENTION

1. Field of the Invention

This invention relates to cameras such as photographic cameras, movie cameras, etc., on which a signal receiver for performing remote control photographic operation is mounted.

2. Description of the Prior Art

So far, it has often been encountered that, when a remote control photograhic operation is to be carried out under a normal lighting condition, light beams directly enter into the camera body through an eyepiece thereof, which affects a light receiving element for an exposure meter to render it unable to indicate an accurate exposure value, or such light may strike the surface of a film in a cinematographic camera. To prevent such undesirable light from entering into the camera body, there has been proposed an eye-piece shutter which is to be placed over the eye-piece at the time of the photographic operation to intercept the undesirable light. This kind of device, however, necessitates a setting operation to cose the eye-piece shutter at the time of phototaking, the setting operation of which is apt to be overlooked by a photographer.

SUMMARY OF THE INVENTION

In view of the inherent disadvantages with the known type of the light intercepting device as described above, it is the primary object of the present invention to provide a camera which is capable of perfectly eliminating the influence of such undesirable light entering into the camera body through the eye-piece at the time of the remote control phototaking operation.

The foregoing object and other objects as well as the construction and functions of the device according to the present invention will become more clearly understandable from the following detailed description of the invention, when read in conjunction with the accompanying drawing.

BRIEF DESCRIPTION OF THE DRAWING

In the drawing:

FIG. 3 is a perspective view of a light signal receiver to be mounted on the camera in FIG. 1;

FIG. 4 is a perspective view of a wireless light receiver to be mounted on the camera in FIG. 1;

FIG. 5 is a perspective view of a cinematographic camera, to which another embodiment of the present invention is applied; and FIG. 6 is a perspective view of a remote control unit to be mounted on the camera shown in FIG. 5.

DETAILED DESCRIPTION OF PREFERRED EMBODIMENTS

Figure 1:
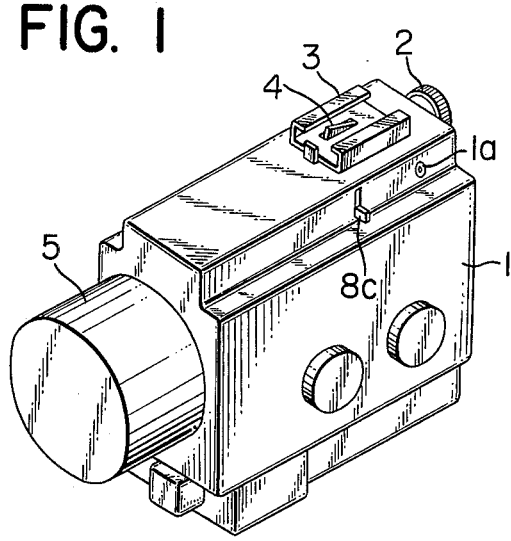
FIG. 1 is a perspective view showing a movie camera, to which one embodiment of the present invention is applied.

Referring now to FIG. 1 illustrating the first embodiment of the present invention, a body 1 of a cinematographic camera is provided with an eye-piece 2, an object lens 5, and an accessory shoe 3. On the bottom part of the accessory shoe, there is projectively provided an interlocking member 4.

The camera body 1 is further provided with a connector 1a.

Figure 2:
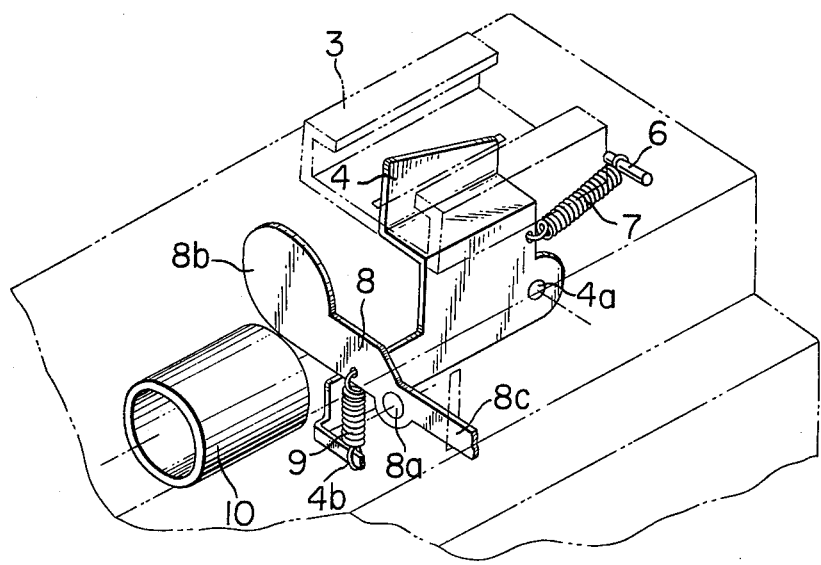
FIG. 2 is also a perspective view showing the light intercepting device incorporated in the camera body shown in FIG. 1.

The interlocking member 4 is provided in an oscillatable manner on the fulcrum 4a as the center of its oscillation, as shown in FIG 2. One end of this interlocking member 4 is fastened to a pin 6 secured at one part of the camera body interior through a spring 7, whereby the interlocking member 4 is energized in the clockwise direction with the fulcrum 4a as the rotational axle.

A light intercepting member 8 is provided in an oscillatable manner with a fulcrum 8a as its rotational axle. A spring 9 is provided between the light intercepting member 8 and the interlocking member 4 to energize the member 8 in the anti-clockwise direction with the fulcrum 8a as the axle of oscillation. The light intercepting member 8 has its one end 8b forming a light intercepting part and the other end 8c projecting outwardly from the camera body 1. The light intercepting part 8b closes a light path for light beams entering into the camera body 1 through the eye-piece 2 and travelling upto a view finder optical system 10, and prevents the light beam from reaching a light receiving element for an exposure meter (not shown) and the surface of a film (not shown). Thus, the light intercepting device as a whole is composed of the interlocking member 4, pin 6, spring 7, light intercepting member 8, and spring 9.

As shown in FIG. 3, light signal receiver 11 comprises a light signal receiving part 11a which receives a signal from a light signal emitter (not shown), a connector 12 to transmit the signal received by the receiver 11a to the connector 1a on the camera body, and an engaging part 13 to be engaged with the accessory shoe 3 provided on the camera body 1.

The operation of the light intercepting device according to the present invention will now be described in the following.

First of all, the engaging part 13 of the light signal receiver 11 is engaged with the accessory shoe 3 on the camera body 1. Upon completion of the engagement, the engaging part 13 pushes down the interlocking member 4, whereby it oscillates in the anti-clockwise direction against the force of the spring 7 with the fulcrum 4a thereof as the axle of oscillation, and one end 4b of the interlocking member 4 lowers. With lowering of this one end 4b, the light intercepting member 8 also oscillates in the anti-clockwise direction with the fulcrum 8a as the axle, whereby the light intercepting part 8b shuts off the light path between the eye-piece 2 and the view finder optical system 10 to prevent harmful light beam entering into the camera body through the eye-piece 2 from reaching the light receiving element for the exposure meter and the surface of the film. It should be noted that, even at the time of mounting the signal receiver 11 on the camera body, an object to be photographed can still be observed by pushing down the projected end 8c of the light intercepting device 8 by hand.

Referring now to FIG. 5 which shows a second embodiment of the present invention, the point of difference in this embodiment from the first one resides in that no end part of the interlocking member projects outwardly of the bottom part of the accessory shoe 3, but an operating member 15 is provided at some other position on the camera body 1 close to the accessory shoe 3. The function of this operating member 15 will be explained in detail in the following in relation to a signal receiver 16 shown in FIG. 6. That is, when the signal receiver 16 is being engaged with the accessory shoe 3 by slide engagement, a small projection 16b provided on the body of the receiver 16 at a position corresponding to that of the operating member 15, so as to be in sliding contact with same moves from a point 0 representing a state where the light intercepting member 8 does not shut out the incident light beam to another point C representing a state where the light intercepting member 8 shuts out the incident light, whereby it causes the interlocking device to actuate, hence causing the light intercepting member 8 to prevent light beams entering into the camera body through the eye-piece 2 from reaching the view finder optical system 10, and also to prevent the same from reaching the light receiving element for the exposure meter and the surface of the film.

Although, for the purpose of explanations, a cinematographic camera has been referred to, it should, of course, be possible that the purpose of the present invention is attained by the use of any other type of camera such as photographic camera.

Also, the signal receiver is not limited to the light signal receiver 11, but any other kind of receiver such as the wireless receiver 14 having an antenna 14a as shown in FIG. 4, or the remote control unit 16 having a cable 16a as shown in FIG. 6 may of course be used.

As stated in the foregoing, the camera according to the present invention is capable of automatically intercepting light from the eye-piece when interlocking by a mounting operation of the signal receiver of the remote control device onto the camera body takes place, so that undesirable influence caused by failure of a manual light intercepting operation can be perfectly avoided.

Although the invention has been described in the foregoing with particular reference to the preferred embodiments thereof, it should be noted that changes and modifications may be made by those skilled in the art without departing from the spirt and scope of the invention as recited in the appended claims.

What is claimed is:

1. A remote controlled camera, wherein a signal receiver to actuate the camera is detachably mounted thereon at the time of its receiving a remote control signal, which comprises in combination:
    a camera body;
    means (3) provided on said camera body for mounting the (7, 8, 9) provided in said camera body for intersecting a light path of incident light extending from an eye-piece of said camera to a view finder optical system upon mounting of said signal receiver onto said camera body by means of said mounting means.

2. The remote controlled camera as claimed in claim 1, wherein said light intercepting means comprises:
    a light intercepting member (8) movable between a first position to intersect said light path and a second position out of said light path; and
    an interlocking member (4, 7, 9) engageable with said signal receiver at the time of mounting the same, and which causes said light intercepting member (8) to move to said first position in response to said mounting of said signal receiver, and causes said light intercepting member (8) to move to said second position upon dismounting of said receiver from the camera body.

3. The remote controlled camera as claimed in claim 2, wherein said light intercepting means further comprises:
    energizing means (9) provided between said light intercepting member and said interlocking member, and which energizes said light intercepting member in the direction of said first position; and
    operating means (8c) provided on said light intercepting member to render same movable from said camera body.

* * * * *

UNITED STATES PATENT AND TRADEMARK OFFICE
CERTIFICATE OF CORRECTION

PATENT NO. : 4,035,817
DATED : July 12, 1977
INVENTOR(S) : YOZO IIDA, et al.

It is certified that error appears in the above-identified patent and that said Letters Patent are hereby corrected as shown below:

First page, in the Abstract, line 7, change "reote" to -- remote --.
Column 4, line 10, after "ing the" insert the following:
-- signal receiver on said camera body; and
    light intercepting means (4, 6, --

Signed and Sealed this

Twenty-first Day of March 1978

[SEAL]

Attest:

RUTH C. MASON
*Attesting Officer*

LUTRELLE F. PARKER
*Acting Commissioner of Patents and Trademarks*